March 22, 1955     J. D. GOODELL ET AL     2,704,842
MAGNETICALLY QUANTIFIED PULSE GENERATING SYSTEMS
Filed July 12, 1951     2 Sheets-Sheet 1

INVENTORS
JOHN D. GOODELL
TENNY LODE
BY Robert M. Dunning ATTORNEY

March 22, 1955

J. D. GOODELL ET AL 2,704,842

MAGNETICALLY QUANTIFIED PULSE GENERATING SYSTEMS

Filed July 12, 1951

INVENTORS
JOHN D. GOODELL
TENNY LODE
BY
Robert M. Dunning ATTORNEY

2,704,842

MAGNETICALLY QUANTIFIED PULSE GENERATING SYSTEMS

John D. Goodell and Tenny Lode, St. Paul, Minn., assignors to The Minnesota Electronics Corporation, St. Paul, Minn., a corporation of Minnesota Application July 12, 1951, Serial No. 236,344

2 Claims. (Cl. 340—347)

This invention relates to pulse generating systems and pertains more particularly to a system for producing quantified pulses.

In the practical use of many electrical and electronic circuits it is desirable to have a source of accurately quantified pulses, quantified pulses being defined here as pulses which are constant with respect to the integral of the area under their wave forms. For instance, current pulses are considered constant when the product of the magnitude of the current in amperes and the time duration of each pulse is constant; voltage pulses may be considered constant when the volt/second integral of each pulse is in one to one correspondence with the volt/second integrals of the other respective pulses.

In the past, pulses of this nature have been produced by using an electronic tube with associated circuitry so designed that with suitable signals applied to the grid circuit the tube will be driven alternately into plate current saturation and plate current cut-off. While some success has attended the practice of these earlier systems, certain factors have militated against the generation of truly quantified pulses, such limting factors including variations in supply voltages, the aging of the tubes and associated components, and the like.

An important feature of the instant invention is to provide apparatus for the generation of accurately quantified pulses by employing a magnetizable element that can be alternately driven to saturation in opposite directions to produce constant ouput integrals of the above mentioned character.

Another feature of the invention resides in the production of such pulses in a manner unaffected by deterioration of the component parts comprising the system or by fluctuations in the source of power supply.

A further feature of the invention resides in the provision of apparatus whereby the frequency of an alternating current signal may be simply and accurately determined.

Still another feature of the invention lies in the translation of analog presentations into digital presentations. In this connection, it is also within the purview of this invention to translate the digital presentations back into analog presentations corresponding to the original analog presentations, thereby permitting wireless transmission of representative signals corresponding to said original analog presentations with a substantial reproduction of the original presentation at the receiving station.

For further objects and advantages which will be manifest therefrom, reference is to be had to the following description taken in conjunction with the accompanying drawings, in which.

Figure 1:
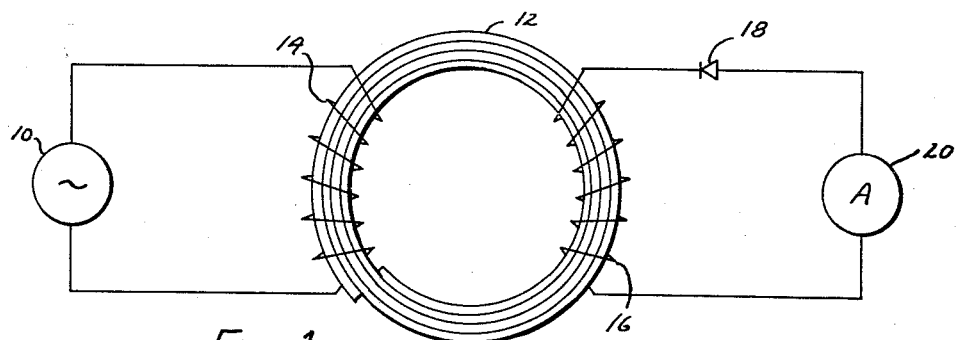
Figure 1 is a schematic diagram of a frequency meter incorporating thereinto the principles disclosed in this specification.

Referring now to Figure 1 for an understanding of the basic principles of our invention, it will presently be seen that the circuit depicted provides a facile and inexpensive way of determining the frequency of an A. C. signal source 10. The circuit includes a magnetizable core element 12 having circumposed thereon an input coil 14 and an output coil 16. The input coil 14 is connected directly to the A. C. source 10, and the output coil 16 has in circuit therewith a rectifier 18 and an ammeter 20. As thus described, it will be appreciated that the coils 14 and 16 are inductively associated with the core element 12.

Figure 2:
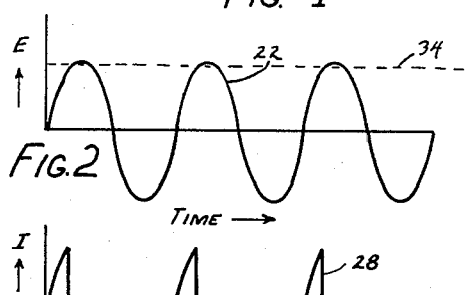
Figures 2–7 depict various input and output wave forms derivable with the circuit of Figure 1.
Figure 3:
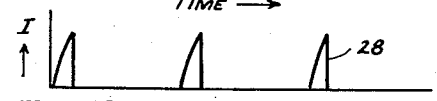
Figure 4:
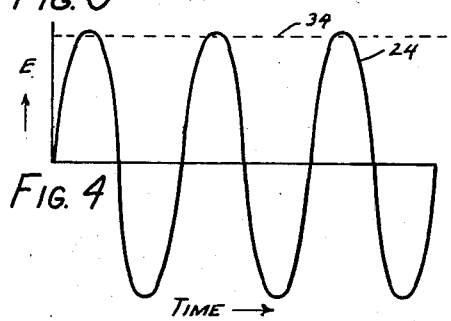
Figure 5:
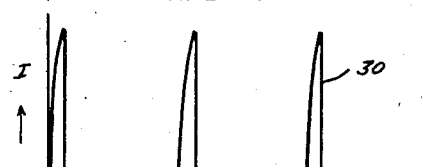
Figure 6:
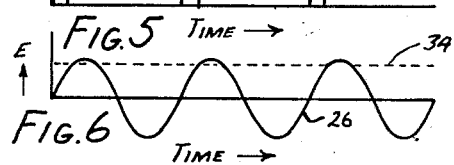
Figure 7:

The signal impressed upon the coil 14 by the source 10 may be a sine wave or it may be some other form. In Figures 2, 4 and 6 there are shown a plurality of sine waves 22, 24 and 26, each denoting a voltage wave of the same frequency, but of different magnitude, to permit the ready comparison thereof with the various output waves respectively shown in Figures 3, 5, and 7 and designated by the numerals 28, 30 and 32. With regard to the waves 22, 24, 26, the magnitude of these waves must be such that during each cycle the magnetic core 12 will be driven from saturation in one direction to saturation in the other direction. As will hereinafter be made more apparent, experience has shown that the material for the core 12 should preferably be selected from those magnetic materials having essentially rectangular hysteresis loop characteristics, such materials being particularly desirable. It is also of benefit in obtaining a rectangularly hysteresis curve to have the core of toroidal configuration. For the purpose of the later description, a magnetic material of this character with a relatively low coercive force is assumed without intending to limit the system to such materials. For obvious reasons, small discrepancies between theory and practice, and negligible errors resulting from the impracticability of obtaining elements that perform in accordance with idealizations, are neglected in this description.

With the foregoing elements in mind, it is believed that the following explanation of the principles involved in the illustrated embodiment of Figure 1 will be readily understood. Assuming for the moment for the sake of simplicity of description that a uni-directional voltage of sufficient magnitude to overcome the coercive force of the magnetizable core 12 is applied to the input coil 14 for a sufficient length of time, then the core 12 will become magnetically saturated in a corresponding direction. On the other hand, if the direction of the applied voltage is reversed, then in a finite interval of time the magnetic material will be saturated in the opposite direction.

Magnetizing a magnetic material from a state of saturation in one direction to a state of saturation in the other direction is associated with a definite quantitative flux change. Being that the coils 14 and 16 are inductively associated with the magnetizable element 12, a current will flow through the secondary or ouput coil 16 whenever there is a change of flux in the primary or input coil 14. A change in flux occurs if, and only if, a magnetizing force of sufficient magnitude to overcome the coercive force of the magnetic material 12 is applied in a direction in which said material is not saturated. Thus, once the core material 12 has been saturated in a given direction the further application of a magnetizing force in that direction will produce no further flux change and no current in the output coil.

It follows from the above that the quantity of current flow in the output coil 16, caused by the flux change produced when the magnetic material 12 is changed from magnetic saturation in one direction to magnetic saturation in the other direction, is a constant related only to the characteristics of the magnetic material. If the magnetizing force is of sufficient magnitude and is applied for a sufficient period of time to change the magnetic core 12 from saturation in one direction to saturation in the other direction, the quantity of current that is induced in the output coil 16 will be constant and independent of any further application of the magnetizing force in that direction.

When an alternating magnetizing force, as represented by the A. C. source of voltage 10, is applied to the magnetizable element 12, this force being sufficient to overcome the coercive force of the material 12, and if the magnetizing force is applied at alternate periods, as by the wave shapes 22, 24, or 26, such that each period of application changes the magnetic element 12 from magnetic saturation in one direction to magnetic saturation in the other direction, then each time the magnetic element is changed from saturation in one direction to saturation in the other direction a pulse of current at constant quantity will be induced in the output coil 16. Under these conditions the output current will consist of pulses of alternating polarity. However, since a rectifier 18 is employed, these pulses will appear at the meter 20 in the form of the pulses shown in the curves 28, 30, or 32, depending on which wave form 22, 24 or 26 is impressed on the input coil 14. From the preceding discussion, it will be recognized that the quantity of current flow represented by each pulse will be constant, and that in this manner the pulses are accurately quantified.

Thus it will be observed that whenever the core 12 is driven by an applied magnetic force that swings it alternately into saturation in opposite directions, the output current induced in the coil 16 will be limited by the flux change of which the core is capable. A comparison of Figures 2–7 will reveal that when the applied magnetizing force is relatively high, as indicated by curve 24 of Figure 4, then the rate of change of flux will be high and the instantaneous current flow will be high in the output circuit, as evidenced by the pulses 30 of Figure 5. Solely for the convenience of explanation, the voltage at which the core 12 saturates in one direction has been denoted by the datum line 34 in each of the Figures 2, 4 and 6. Under the conditions exemplified in Figure 4 it will be noted that the initial upswing of the curve reaches the line 34 sooner in point of time than does the curve 22 of Figure 2 and considerably more rapidly than does the curve 26 of Figure 6. Once having reached the region of saturation there is no further change of flux produced by the curve 24, and therefore the duration of the output current pulses 30 will be correspondingly relatively short. If the applied magnetizing force is relatively low, for instance of the magnitude illustrated by the curve 26 of Figure 6, then the rate of change will be low and the instantaneous magnitude of the current pulses 32 will be relatively low but the time duration of each pulse 32 will be relatively longer than the pulses 30. However, the total amount of flux change will be constant in each instance represented by Figures 2–7, and consequently the total corresponding flow of output current will be constant in each of Figures 3, 5, and 7.

Briefly stated, the magnetization of any magnetic element is quantitatively bounded within two limits which are called saturation in opposite directions. The change of magnetization of any magnetic element is associated with a directly proportional flux change. Any flux change results in the generation of current in an inductively associated coil and this current is directly proportional to the flux change, and the instantaneous magnitude of the current is directly proportional to the rate of change of flux. However, the time duration of the flux change possible in the process of magnetization from one limiting state to another limiting state is obviously a function of the rate of magnetization. Thus the greater the rate of magnetization, the greater the rate of flux change and the higher the instantaneous output current. Conversely, the slower the rate of magnetization, the lower the rate of flux change and the lower the instantaneous output current. The quantity of flux change and hence the quantity of output current produced by a change of magnetization from saturation in one direction to saturation in the other are constant.

In that a series of equal output pulses 28 can be produced from the A. C. wave 22, it will be appreciated that the structure depicted in Figure 1 may find practical use as a frequency meter. The magnitude of the voltage wave 22 being of sufficient magnitude so that the core 12 will be driven from saturation in one direction to saturation in the other direction, the output signal at the coil 16 will consist of accurately quantified current pulses which are rectified by the rectifier 18 and the current indicated by the meter 20 will be the pulses 28. Under these conditions the current read on the meter 20 will be directly proportional to the frequency of the signal 22 and will be independent of its voltage or wave form. In practice we have constructed frequency meters of this type which embrace the entire audio frequency range, obtaining a very high order of accuracy. As a typical example, a meter reading 400 cycles per second center scale is accurate within plus or minus 1.5 cycles per second for a change in applied voltage between 90 and 140 volts.

The wave forms of Figures 4–7, the waves 24 and 30 being coupled and the waves 26 and 32 being coupled, result in the areas under the pulses of the curves 30 and 32 being similarly a constant ampere second integral irrespective of the applied signal voltage. This result obtains by virtue of the fact that as the amplitude of the applied signal increases, the amplitude of the output signal also increases, but its time duration correspondingly decreases and vice versa.

Figure 9:
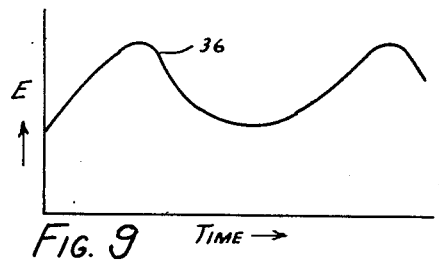
Figures 9–11 are several wave forms referred to in the detailed explanation of Figure 8.
Figure 10:
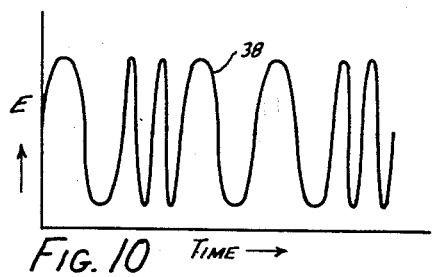
Figure 8:
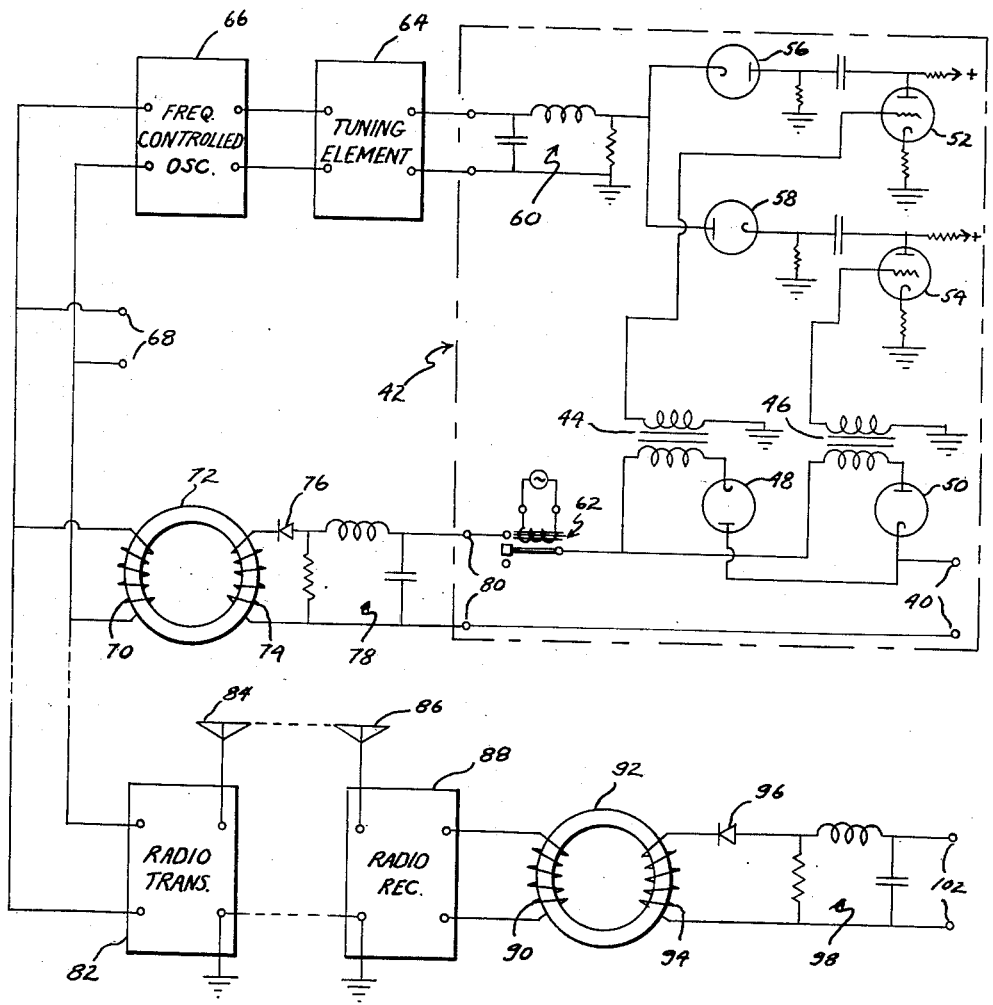
Figure 8 is a combined diagram illustrating a translating device for converting analog presentations to digital ones, and for further transmitting the digital presentations by wireless, if desired, to thereby provide a servo-system embodying the principles underlying this invention.

For the sake of brevity, Figure 8 has been drawn to represent two practical applications of our invention, one application being an elaboration of the other. In Figure 1, the circuitry there illustrated converted an alternating current into a direct current in such manner that the magnitude of the direct current was directly proportional to the frequency of the applied alternating current. Substantially the converse is true in the instant embodiment presently to be described, for in this situation we start with a signal 36, sketched in Figure 9, which is in analog form and convert such signal into a digital representation 38, sketched in Figure 10, of the same information or intelligence as the original signal 36. The signal 36 is applied to the terminals 40 of a comparator, designated generally by the reference numeral 42. It will be understood that many types of circuits may be used to accomplish the comparator function, and while the depicted one is descriptive and practical, it is not necessarily typical.

The comparator 42 comprises a pair of transformers 44 and 46 having in circuit therewith a pair of rectifiers 48 and 50 connected in opposed fashion with each other. The output or secondary sides of the transformers 44 and 46 are connected to the grids of the amplifier tubes 52 and 54, and the plate current from these tubes is rectified by a pair of rectifiers 56 and 58 before being delivered to a filter 60 composed of suitable resistance, capacitance and inductance of appropriate values. The comparator 42 also includes a vibrator 62 in circuit with the primary sides of the transformers 44 and 46, the purpose of which will presently be explained.

The filtered comparator output is fed to a tuning element 64 which is connected to a frequency controlled oscillator 66. The oscillator produces the signal 38 in a manner soon to be made apparent, which signal may be studied at the terminals 68 with a suitable instrument such as an oscilloscope.

The same signal 38, which is an alternating voltage, is impressed on an input coil 70 inductively associated with a magnetizable core 72 having thereon an output coil 74. The elements 70, 72 and 74 correspond to the previously mentioned elements 14, 12 and 16, respectively. The output current from the coil 74 courses through a rectifier 76 and a filtering circuit 78 of suitable resistance, reactance and capacitance. By means of a set of terminals 80, the filter 78 is connected in circuit with the vibrator 62, the transformers 44, 46, the rectifiers 48, 50, the signal 36 being introduced into the comparator 42 at the terminals 40.

From the foregoing, it will be seen that at any instant of time D. C. potentials appear at the terminals 40 and 80, and if the potential at 80 is positive with respect to that at 40, the rectifier 48 will tend to block the passage of current through the primary side of the transformer 44, the rectifier 50 permitting the flow of current through the primary side of the transformer 46. The vibrator 62, driven from an auxiliary power source at say 400 cycles per second, alternately makes and breaks the circuit between the filter 78 and the transformers 44 and 46 to accomplish this. Conversely, if the potential of the terminals 40 is positive with respect to the potential at 80, then each time the vibrator 62 closes the circuit a pulse of current passes through the primary side of the transformer 44.

After amplification of the various output pulses from the secondary sides of the transformers 44 and 46 by the amplifiers 52 or 54, they are filtered at 60 and the resulting power is delivered to the tuning element 64 as direct current. This direct current voltage is applied to the tuning element 64 in a suitable sense so that the tuning element adjusts the frequency of the frequency controlled oscillator 66 to produce the output voltage 38 at 80 that will continually approach the input signal voltage 36 being introduced to the system at 40. This arrangement is such that the output frequency from the frequency controlled oscillator 66 is proportional to the voltage 36 when such voltage equals the voltage at 80. Thus the frequency of the alternating signal 38, which appears at the terminals 68 as well as at the coil 70, is directly proportional to the input signal 36 and is continually adjusted by the system to follow the variations in the signal 36. While various devices or instruments can be used to observe the digital signal 38 at 68, including the previously mentioned oscilloscope, it will also be recognized that the frequency meter of Figure 1 may be employed, the voltage curve 38 serving as the source 10 and the meter 20 being suitably calibrated to read frequency.

Figure 11:
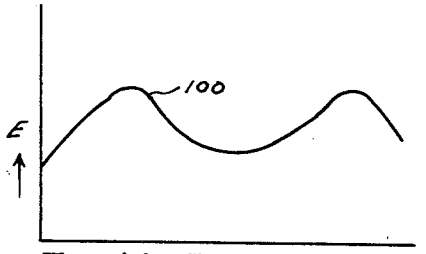

In some instances, for example where remote servomechanisms are to be operated, it is desirable to transmit by wireless the signal 38 and thereafter substantially reproduce or track the original analog curve 36. With this aim in view, it will be seen that an extension of the basic circuit of Figure 8 includes a radio transmitter 82 for properly modulating and transmitting the wave 38 via an antenna 84 to an antenna 86 which is attached to a radio receiver 88. After demodulation by the receiver 88, the received signal is impressed upon an input coil 90 carried on a magnetizable core 92, the core 92 being also provided with an output coil 94. In circuit with the output coil 94 is a rectifier 96 and a filter 98, the filter 98 including appropriate resistance, reactance and capacitance for smoothing out the current pulses provided by the coil 94. The elements 90—98 are similar to the elements 70—78 and function to provide a curve 100 (see Figure 11) at the terminals which tracks the curve 36.

A typical application of this last described feature would be in the remote operation of a radar indicator. In such an installation the antenna of the radar station observing a signal is rotated, and the rotation could easily be translated by conventional methods into a direct current voltage that is directly proportional to the angular displacement of the antenna rotary shaft from a fixed reference. Such a direct current voltage would correspond to the curve 36 and would be converted into an alternating voltage corresponding the the curve 38 which would be modulated and transmitted by the transmitter 82. The receiver 88 would then pick up the signal, and reconversion to a direct current voltage corresponding to the curve 100 could then be effected by the elements 90—102. From the terminals 102 the reconverted signal could be amplified and utilized in driving a motor to position its shaft in direct correspondence with the shaft of the master radar antenna.

Figure 12:
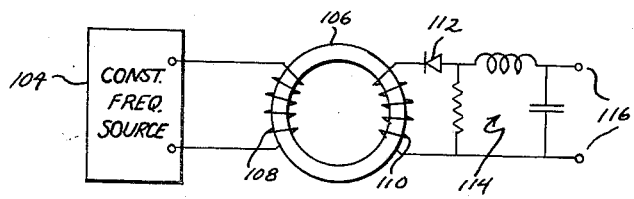
Figure 12 represents a device for obtaining a precision D. C. voltage.

Referring to Figure 12, there is illustrated a device for obtaining a precision direct current voltage, the device comprising a constant frequency source 104, a magnetizable core 106, input and output coils 108 and 110, a rectifier 112, a filtering circuit 114 and output terminals 116. For a ready understanding of the functioning of the elements 104—116, reference should be had to the previously described elements 66—68. However, one important distinction resides in the fact that in this circuit application the source of constant frequency 104 is accurately stabilized with respect to frequency, an oscillator having a crystal control being recommended. In this way the D. C. voltage at the terminals 116 is precisely controlled by the frequency of the source 104, as will be understood from the earlier discussed principles.

At the present time various means, such as voltage regulator tubes, standard battery cells and other known apparatus, are used to obtain accurately stabilized D. C. voltages. However, it will be appreciated that our system possesses advantages of adjustability, a high degree of stability and other features which make it especially attractive wherever a precision voltage is desired.

In conclusion, it should be remembered that the preceding structural arrangements produce accurately quantified pulses independent of wave form deterioration, without interference from noise signals, without drift due to variations in supply voltages, and without adverse effect due to the aging of the components making up the systems.

In accordance with the patent statutes, we have described the principles of operation of our magnetically quantified pulse generating systems, and while we have endeavored to set forth the best embodiments thereof, we desire to have it understood that these are only illustrative thereof and that obvious changes may be made within the scope of the following claims without departing from the spirit of our invention.

We claim:

1. In a quantified pulse generating system of the class described, a pair of transformers, a rectifier in circuit with each transformer connected to pass current in one direction through one transformer and in the other direction through the second transformer, oscillator means for producing a frequency signal in accordance with any output from said transformers, a magnetizable core having substantially rectangular hysteresis loop and relatively low coercive force characteristics, an input coil and an output coil inductively associated with said core, said input coil being connected to receive the frequency signal from said oscillator means and said frequency signal being of sufficient magnitude to saturate said core in reverse directions, rectifier means connected in circuit with said output coil, means for filtering the output from said rectifier means, and current interrupting means for periodically making and breaking a circuit between said filtering means and said transformers, a varying direct current voltage source in circuit with said transformers, said transformers feeding an output signal to said oscillator means whenever the voltage at said current interrupting means is different from said varying source and said interrupting means is in circuit making position.

2. The structure described in claim 1 in which transmitting means are employed to transmit said frequency signal to a remote point, and second input and output coils are inductively associated with a second magnetizable element.

References Cited in the file of this patent

UNITED STATES PATENTS

| | | |
|---|---|---|
| 1,889,597 | Fitzgerald | Nov. 29, 1932 |
| 1,929,259 | Rich | Oct. 3, 1933 |
| 2,182,324 | Stanek | Dec. 5, 1939 |
| 2,221,591 | Lansdale | Nov. 12, 1940 |
| 2,248,586 | Rowell | July 8, 1941 |
| 2,409,696 | Lewis | Oct. 22, 1946 |
| 2,498,933 | Wallace | Feb. 28, 1950 |
| 2,539,623 | Heising | Jan. 30, 1951 |
| 2,640,974 | Oman et al. | June 2, 1953 |